United States Patent [19]

Li

[11] 4,251,382
[45] * Feb. 17, 1981

[54] ABSORPTION PAIRS OF 1-CHLORO-2,2,2-TRIFLUOROETHANE AND FURAN-DERIVATIVES

[75] Inventor: Chien C. Li, Williamsville, N.Y.

[73] Assignee: Allied Chemical Corporation, Morris Township, Morris County, N.J.

[ * ] Notice: The portion of the term of this patent subsequent to Oct. 23, 1996, has been disclaimed.

[21] Appl. No.: 61,109

[22] Filed: Jul. 26, 1979

Related U.S. Application Data

[60] Continuation-in-part of Ser. No. 818,038, Jul. 22, 1977, Pat. No. 4,172,043, which is a continuation-in-part of Ser. No. 734,775, Oct. 22, 1976, abandoned, which is a division of Ser. No. 567,043, Apr. 10, 1975, Pat. No. 4,005,584.

[51] Int. Cl.$^3$ ............................................... C09K 5/04
[52] U.S. Cl. ........................................ 252/69; 62/112
[58] Field of Search ............................ 252/69, 67, 68; 260/347.3, 347.4, 347.5, 347.8; 62/112

[56] References Cited

U.S. PATENT DOCUMENTS

| | | | |
|---|---|---|---|
| 2,035,541 | 3/1936 | Fleischer | 252/69 X |
| 2,040,902 | 5/1936 | Zellhoefer | 252/69 X |
| 4,005,584 | 2/1977 | Li | 62/112 |
| 4,042,524 | 8/1977 | Nychka et al. | 252/69 |
| 4,172,043 | 10/1979 | Li | 252/69 |

OTHER PUBLICATIONS

Zellhoefer, "Solubility of Halogenated Hydrocarbon Refrigerants in Organic Solvents", Industrial & Engineering Chemistry, 1937, pp. 548-551.
Hainsworth, "Refrigerants and Absorbents", Refrigerating Engineering, vol. 48, No. 2, pp. 97-100 & No. 3, pp. 201-204, 1944.
Elseman, "Why Refrigerant 22 Should Be Favored for Absorption Refrigeration", Ashrae Journal 45-50, 1959.
Phillips, "Gas Air Conditioning Concepts", in Proceedings of the Second Conference of Natural Gas Research and Technology, Jun. 5-7, 1972.

*Primary Examiner*—Harris A. Pitlick
*Attorney, Agent, or Firm*—Alan M. Doernberg; Jay P. Friedenson

[57] ABSTRACT

1-chloro-2,2,2-trifluoroethane (refrigerant 133a) is dissolved in a furan-derivative absorbent, and especially an ether of tetrahydrofurfuryl alcohol, to form an absorption refrigerant pair composition. It exhibits a good combination of performance, capacity, stability, low toxicity and convenient operating pressures. These compositions are useful in methods of absorption refrigeration, cooling and heating and especially in an absorption heat pump.

5 Claims, No Drawings

ABSORPTION PAIRS OF 1-CHLORO-2,2,2-TRIFLUOROETHANE AND FURAN-DERIVATIVES

CROSS-REFERENCE TO RELATED APPLICATIONS

This is a continuation-in-part of copending U.S. Application Ser. No. 818,038, filed July 22, 1977, now U.S. Pat. No. 4,172,043 which is a continuation-in-part of U.S. Application Ser. No. 734,775, filed Oct. 22, 1976, now abandoned, which was a division of U.S. Application Ser. No. 567,043, filed Apr. 10, 1975, now U.S. Pat. No. 4,005,584.

BACKGROUND OF THE INVENTION

This invention relates to novel absorption pairs for absorption heating and cooling.

In view of diminishing fossil fuel supplies, and hence, increasing fuel costs, there is a need to minimize the amount of fuel society consumes to heat habitable space.

The heat pump concept, wherein available energy is taken from an ambient source such as outside air, and combined with fuel energy to heat space, is not new. Existing concepts include electrically driven-vapor compression heat pumps and absorption heat pumps. The latter require an absorption pair which comprises a solvent and a solute wherein the solvent remains a liquid, which may be a solution, throughout the operation of the apparatus, and the solute having a liquid and vapor phase in the cycles of the operation. The solute must be soluble in the solvent and must be readily separable as a vapor from the solvent by means of evaporation. In addition, the solute must be suitable for condensation from the vapor back to a liquid form. In general, all absorption heating apparatus require essentially the same parts and function in essentially the same way regardless of the particular solute and solvent used. Nevertheless, heat pumps as disclosed in U.S. Pat. Nos. 4,106,309, 4,127,009, 4,127,010 and 4,127,993 of B. A. Phillips are preferred. The major components of the apparatus are a generator, condenser, evaporator, absorber and absorption pair (also called absorber pair). The solute passes through all units and the solvent, sometimes also known as the absorbent, is confined to movement through the generator and absorber.

In operation, a mixture of absorbent and solute is heated in the generator to boil off most of all of the solute which rises as a vapor through a connecting conduit to the condenser. The mixture may be heated in the generator by any suitable means such as a gas flame, geothermal heat, solar heat or warm water.

The generator and condenser operate at relatively high pressure, so that condensing temperature of the solute is sufficiently high to permit rejecting the latent heat emitted by the condensing solute to outside air or cooling water passing through or around the condenser.

The liquid solute leaving the condenser passes through a conduit to a throttling valve (or its equivalent), through the throttling valve and through another conduit to the evaporator. The throttling valve throttles the liquid solute to a lower pressure so it will boil at a relatively low temperature in the evaporator and thus absorb heat from air or water passing through or around the evaporator.

The vaporized solute passes from the evaporator through a conduit to the absorber where heat of mixing is emitted (preferably to cooling water passing therethrough) as it is dissolved in cool absorbent which has been carried to the absorber by means of a conduit connecting the absorber with a generator outlet. The mixture of absorbent and solute resulting in the absorber then passes through a conduit to the generator where it is reheated to continue the process.

Any suitable material of construction for the apparatus may be used which can withstand the encountered temperature, pressure and corrosive properties, if any, of the solvent and solute. For the present compositions, aluminum, copper and their alloys are preferred. It is desirable, however, that minor components of a heat pump system (such as pump parts) be made of steel or other metals. Thus, it is desirable for the solute/solvent system to have good stability in contact with steel as well as with aluminum and copper.

Such a heat absorption apparatus is particularly desirable since moving parts, if any, are minimal when compared with the moving parts found in electrically driven-vapor compression heat pumps.

Unfortunately, the known solute/solvent systems for heat pumps have serious disadvantages. The most common solute/solvent pair (absorber or absorption pair) is ammonia/water. The ammonia/water pair has a disadvantage since the heating efficiency of apparatus utilizing the ammonia/water absorber pair is not as high as desired; i.e. the coefficient of performance (COP) practically attainable is generally less than about 1.30 at low generator temperature, i.e. below 180° F., and at high generator temperatures, i.e. 220° F., is generally below about 1.40. COP is a measure of the efficiency of the absorption cycle and is the ratio of the heat output to the energy input. The ammonia/water combination has additional disadvantages. Water is highly volatile, thus preventing complete separation of the ammonia from the water in the generator at high generator temperatures. The condensing pressure required to condense the ammonia is undesirably high, thus requiring equipment capable of withstanding such pressure.

The only other presently commercial absorber pair is water/lithium bromide wherein water is used as the solute and lithium bromide is used as the absorbent. The water/lithium bromide absorber pair (and the related water/lithium chloride absorber pair) has undesirable characteristics. For example, water as a solute is limited to an evaporation temperature of above about 32° F., which is its freezing point. Lithium bromide is not sufficiently soluble in water to permit the absorber to be air cooled. The extremely low pressures in the system require large vapor conduits. Unless the system is precisely controlled, lithium bromide can crystallize and cause fouling of the system and the generator temperature cannot efficiently operate below 180° F. nor above 215° F. Additionally, aqueous lithium bromide solutions are corrosive, thus requiring special inhibitors and alloys for suitable apparatus.

Other absorber pairs which have been suggested have not been commercially accepted due to one or more disadvantages. Such disadvantages include a lack of sufficient affinity of the absorbent for the solute vapor, thus preventing sufficient absorption of the solute vapor to draw in and compress the solute. The absorber pairs have frequently not been mutually soluble over the whole range of operating conditions, thus permitting crystallization and the formation of solid articles which make it difficult or impossible for proper fluid circulation. The absorbent has frequently been too volatile, thus preventing the refrigerant vapor leaving the generator to be adequately purified. When absorbent evaporates from the generator, the efficiency of the system is frequently substantially reduced since energy input is wasted in evaporation. Additionally, the absorbent pairs previously suggested are frequently unstable, cause corrosion of the apparatus, are toxic or are highly flammable. Absorption pairs suggested in the prior art frequently have unacceptably high or unacceptably low working pressures. The working pressures should be as near to atmospheric pressure as possible to minimize equipment weight and minimize leaking into or out of the system. In addition, pressure difference between the high side and low side is frequently too high to facilitate circulation of the solution. The solutes suggested in the prior art frequently have a latent heat of evaporation which is unacceptably low, thus requiring large quantities of fluids to be circulated and the coefficient of performance of other absorber pairs suggested in the prior art is usually too low for serious consideration in commercial apparatus.

Some absorber pairs including a halogenated hydrocarbon solute (refrigerant) and an organic absorbent have been explored over the years for absorption refrigeration. Although certain specific absorber pairs wherein the absorbent included a furan-type ring had been proposed in U.S. Pat. No. 2,040,902 as a part of a program exploring numerous potential absorber pairs, no further discussion of furan-type absorbents has appeared in the art. Instead, subsequent exploratory work with organic absorbents has concentrated on acyclic glycol ethers and particularly on DMETEG (dimethoxytetraethylene glycol) and the ethyl ether of diethylene glycol acetate. More recently, and until the present invention, exploratory work on organic absorbents for halogenated hydrocarbon refrigerants has apparently lain dormant.

BRIEF DESCRIPTION OF THE INVENTION

In accordance with this invention, there is provided novel absorber pairs for absorption heating and refrigeration which have high coefficients of performance, have good stability, cause little corrosion, have relatively high flash points, operate at approximately atmospheric pressure and have relatively low toxicity. The high coefficient of performance is due to a strong affinity between the solute and solvent, good mutual solubility at absorber conditions and ease of separation at generator conditions, good absorbent volatility and a solute having a high latent heat of vaporization.

The new and useful compositions of matter of the invention comprises from about 4 to about 60 weight percent of 1-chloro-2,2,2-trifluoroethane dissolved in about 40 to about 96 weight percent of a furan ring-containing compound having a boiling point between about 140° C. and 250° C. and being of the formula:

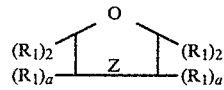

wherein $R_1$ is independently at each occurrence H; lower alkyl; lower alkoxy; phenyl; lower alkylene phenyl; hydroxy containing lower alkyl; lower alkyl carboxy; alkoxy alkyl of from 2 through 6 carbon atoms; lower alkylene carboxylate of from 2 through 6 carbon atoms; fluorine or chlorine; a is independently at each occurrence an integer of 1 or 2; and Z is a single or double bond; provided that, when Z is a single bond, a is 2, when Z is a double bond, a is 1, and provided that the compound contains at least one $R_1$ group having an oxygen atom which has a single bond to a carbon atom.

Preferred compositions are ones in which the absorbent is as alkyl tetrahydrofurfuryl ether and especially ethyl tetrahydrofurfuryl ether. Exemplary are tetrahydrofurfuryl ethers of the formula $(C_4H_7O)CH_2OR$ where R is alkyl of 1-4 carbons.

DETAILED DESCRIPTION OF THE INVENTION

In general, in accordance with this invention, the solvent used in the absorption pair is an asymmetrical furan ring-containing compound having a boiling point between about 140° and 250° C. The compound has the general formula

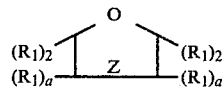

wherein $R_1$, a and Z are as previously defined and the compound contains at least one $R_1$ group having an oxygen atom which has a single bond to a carbon atom.

Lower alkyl, lower alkoxy, lower alkyl carboxy, or lower alkylene as used herein means alkyl, alkoxy or alkylene of from 1 through 5 carbon atoms. Examples of lower alkyl groups are $—CH_2CH_3$; $—CH_3$;

and $—CH_2CH_2CH_3$.

Examples of lower alkoxy groups are $—OCH_3$; $—OCH_2CH_3$ and

Phenyl groups are those groups containing a phenyl ring which is unsubstituted or substituted with methyl, ethyl, hydroxy, methoxy, ethoxy, methyl methoxy, fluorine or chlorine. Examples of phenyl groups are

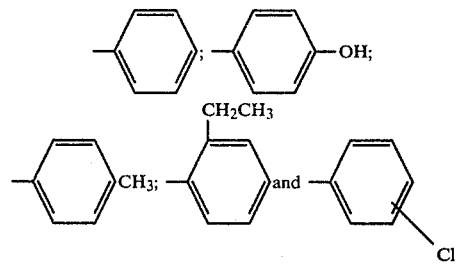

Lower alkylene phenyl groups are phenyl groups connected to the furan ring by a lower alkylene group. Examples of such groups are

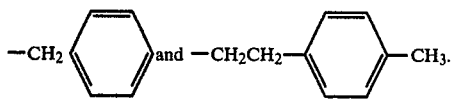

Examples of hydroxy containing lower alkyl groups are —CH$_2$OH; —CH$_2$CH$_2$OH and

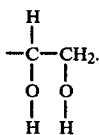

Examples of lower alkyl carboxy groups are —COOH; —CH$_2$COOH and —CH$_2$CH$_2$COOH.

Examples of alkoxy alkyl groups, i.e., those containing 2 to 6 carbon atoms, are —CH$_2$OCH$_3$; —CH$_2$OCH$_2$CH$_3$; —CH$_2$OCH$_2$CH$_2$CH$_3$; —CH$_2$OCH$_2$CH$_2$CH$_2$CH$_3$ and CH$_2$CH$_2$OCH$_3$. Preferred alkoxy alkyl groups are those containing either 5 or 6 carbon atoms due to higher efficiency at high generator temperature and due to increased stability, those alkoxy alkyl groups wherein the intermediate alkyl portion, i.e. that portion attached to the furan ring contains 2 or 3 carbon atoms. When the intermediate alkyl group is ethyl the furan ring compound unexpectedly exhibits improved solubility for the fluorocarbon.

Examples of lower alkylene carboxylate groups, i.e., those containing 2 to 6 carbon atoms, are

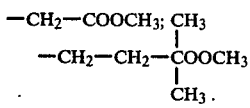

It is theorized that the boiling point of the simple furan ring is increased by adding an alkyl or an alkoxy group to the furan ring to form an asymmetrical molecule. The added group should preferably permit an increase in the negative charge on the furan ring oxygen atom.

The furan ring-containing compounds employed in the present invention are usually characterized by high flash points which reduce the flame hazard when they are used.

Asymmetrical as used in relation to the furan ring-containing compound means either that at least one of the R$_1$ groups at the 2 position on the furan ring is different from both of the R$_1$ groups at the 5 position or at least one of the R$_1$ groups at the 3 position is different from both of the R$_1$ groups at the 4 position. In the preferred furan ring compounds, at least one of the R$_1$ groups at the 2 position is different from both of the R$_1$ groups at the 5 position.

Alkyl as used above means an aliphatic hydrocarbon radical in which the hydrogens may be wholly or partially substituted by fluorine or chlorine.

The compound should preferably contain at least one R$_1$ group having an oxygen atom which is bonded on one side to a carbon atom or a hydrogen atom. At high generator temperatures, carboxy groups, particularly free rather than esterified carboxy groups, should be avoided since such groups tend to increase the corrosiveness of the compound and tend to decompose more rapidly than other groups. Carboxy groups are, however, suitable for compounds which will be used at low generator temperatures, i.e., below 225° F. The more preferred R$_1$ groups are those containing an alochol or either oxygen atom.

The foregoing furan ring-containing compounds may be prepared by known procedures. Detailed discussions of the chemistry of furan and its derivatives are found in Chapter 4 of *Heterocyclic Compounds Volume I*, edited by Robert C. Elderfield, Wiley and Sons, Inc., 1950 and at pages 377 through 490 of *Advances in Heterocyclic Chemistry Volume 7*, edited by A. R. Katritzky and A. J. Boulton, Academic Press, 1966.

Examples of such synthesis are described in columns 7-12 of U.S. Pat. No. 4,005,584, which disclosure is incorporated herein by reference.

Representative of compositions according to the present invention are compositions of 1-chloro-2,2,2-trifluoroethane (refrigerant 133a) and ethyl tetrahydrofurfuryl ether (ETFE). The following comparisons are made between this composition and similar compositions of dichlorofluoromethane (refrigerant 21) and ETFE:

| Solubility of refrigerant in ETFE at: | 133a-ETFE | 21-ETFE |
| --- | --- | --- |
| 110° F. (43° C.) | 37% (1) | 43% (1) |
| 250° F. (121° C.) | 24% (2) | 29% (2) |
| 300° F. (150° C.) | 13.5% (2) | 18% (2) |
| 350° F. (177° C.) | 7% (2) | 9% (2) |
| 400° F. (204° C.) | | |
| Latent Heat of Vaporization of Refrigerant at: | 133a | 21 |
| 10° F. (−18° C.) | 93.97 | 107.50 |
| 40° F. (4° C.) | 90.17 | 103.63 |

(1) Under the vapor pressure of solute at 40° F.
(2) Under the vapor pressure of solute at 120° F.

| Stability of: | Good For* | Chloride** | Good For* | Chloride** |
| --- | --- | --- | --- | --- |
| ETFE-Aluminum Refrigerant at 350° F. (177° C.) | 180–210 days | 8.7 | 30–90 days | 13.5 |

*An evaluation of "good" or better meant that the metal strip was still shiny and that the solution was only a pale color. After the indicated period, the evaluation was "fair" or "poor" as indicated below in Example 3.
**Parts per million chloride as determined by a chloride analyzer after 210 days.

EXAMPLE 1

The operation of 133a-ETFE under air-conditioning of a 110° F. (43° C.) absorber, a 120° F. (49° C.) condenser, a 40° F. (4° C.) evaporator and a generator of 300° F. (150° C.) is simulated by the following calculations based upon one ton of refrigeration.

Assuming the flows were 179.4 lbs/hr refrigerant through the condenser and evaporator, 481 lbs/hr of weak liquor from the generator to the absorber and 660 lbs/hr of rich liquor from the absorber to the generator. Heat inputs would be 25,358 BTUs/hr into the generator and 12,000 BTUs/hr into the evaporator. Heat outputs would be 16,170 BTUs/hr from the absorber and 21,185 BTUs/hr from the condenser. 36,168 BTUs/hr would be transferred from the weak liquor to the rich liquor (in a liquid heat exchanger). The COP$_c$ would be 12,000 divided by 25,358 or 0.473.

EXAMPLE 2

Similar calculations made at generator temperatures of 250° F. and 350° F. produced calculated $COP_c$ values of 0.464 and 0.452 respectively. If the evaporator temperature is lowered to 0° F., a very low $COP_c$ value is obtained (0.155) for a 300° F. generator and a low $COP_c$ value is obtained (0.366) for a 350° F. generator. The results of these calculations are displayed in Table 1 along with similar results for refrigerant 21:

TABLE 1

| Evaporator | 40° F. | | | 0° F. | | |
|---|---|---|---|---|---|---|
| | 21 | 133a | % loss | 21 | 133a | % loss |
| Generator | | | | | | |
| 250° F. | .566 | .464 | 17.9 | — | — | — |
| 300° F. | .596 | .473 | 20.6 | .344 | .155 | 54.9 |
| 350° F. | .571 | .452 | 20.8 | .456 | .366 | 19.7 |
| 400° F. | .546 | — | — | — | — | — |

Thus, except for conditions of 300° F. generator and 0° F. evaporator, the loss is about 20%. Under conditions of 0° F. evaptorator, one can merely operate at a higher generator temperature to avoid large losses. In actual applications, COP losses resulting from a switch from refrigerant 21 to refrigerant 133a have been less than 10% and have, accordingly, not made performance uncompetitive as might have been expected from the published literature for DMTEG-133a or even from the calculated values.

EXAMPLE 3—STABILITY MEASUREMENTS WITH ALUMINUM

Stability testing was conducted on mixture of 21 and, in some cases, a stabilizer with refrigerants 21 and 133a. Samples of 20 mL ETFE and about 6 grams refrigerant were placed in test tubes with a 5 mm diameter, 10 cm along rod of aluminum 1100. Each tube was sealed and placed in an over at 177° C. (350° F.) for successive 30 day periods. The color of the liquid and appearance of the strips were recorded at 30, 60, 90, 180 days and 210 days when the liquid was analyzed by chloride analyzer for chloride ions. The results are displayed in Table 2, with the symbol "TDP" representing 1500 ppm triisodecylphosphite stabilizer added to each tube.

TABLE 2

| | Stability With Aluminum at 350° F. | | | | |
|---|---|---|---|---|---|
| | 30 | 90 | 180 | 210 Days | |
| ETFE | Days | Days | Days | Color | Chloride (ppm) |
| +133a | E | G | G | F | 8.7 |
| +21 | G | F | F | P | 13.5 |

TABLE 2-continued

| | Stability With Aluminum at 350° F. | | | | |
|---|---|---|---|---|---|
| | 30 | 90 | 180 | 210 Days | |
| ETFE | Days | Days | Days | Color | Chloride (ppm) |
| +133a + TDP | E | G | G | F | 7.4 |
| +21 + TDP | G | G | F | F | 6.6 |

E = excellent
G = good
F = fair
P = poor

EXAMPLE 4—STABILITY MEASUREMENTS WITH STEEL

Tubes were prepared with a tab of cold-rolled steel and a liquid mixture of 20 weight % of refrigerant 133a and 80 weight % ETFE. Samples kept at 75° F. (24° C.) for 60 days showed no visible change. Samples kept at 400° F. (204° C.) for 60 days showed some blackening of the rods and formation of a precipitate. Refrigerant 133a outperforms refrigerant 21 in this test.

What is claimed is:

1. A composition of matter comprising from about 4 to about 60 weight percent of 1-chloro-2,2,2-trifluoroethane dissolved in about 40 to about 96 weight percent of an asymmetrical furan ring-containing compound, said compound having a boiling point between about 140° C. and 250° C. and the generic formula:

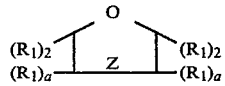

wherein $R_1$ is independently at each occurrence H; lower alkyl; lower alkoxy; phenyl; lower alkylene phenyl; hydroxy containing lower alkyl; lower alkyl carboxy; alkoxy alkyl of from 2 through 6 carbon atoms; lower alkylene carboxylate of from 2 through 6 carbon atoms; fluorine or chlorine; a is independently at each occurrence an integer of 1 or 2; and Z is a single or double bond; provided that, when Z is a single bond, a is 2, when Z is a double bond, a is 1, and provided that the compound contains at least one $R_1$ group having an oxygen atom which has a single bond to a carbon atom.

2. The composition of claim 1 wherein said asymmetrical furan ring-containing compound is an alkyl tetrahydrofurfuryl ether.

3. The composition of claim 2 wherein said asymmetrical furan ring-containing compound is of the formula $(C_4H_7O)CH_2OR$ where R is alkyl of 1–4 carbons.

4. The composition of claim 3 wherein said asymmetrical furan ring-containing compound is ethyl tetrahydrofurfuryl ether.

5. The composition of claim 4 consisting of 1-chloro-2,2,2-trifluoroethane and ethyl tetrahydrofurylfuryl ether.

* * * * *